C. H. A. F. L. ROSS.
AUTOMATIC FIREARM.
APPLICATION FILED JUNE 4, 1909.
958,545.
Patented May 17, 1910.
11 SHEETS—SHEET 1.
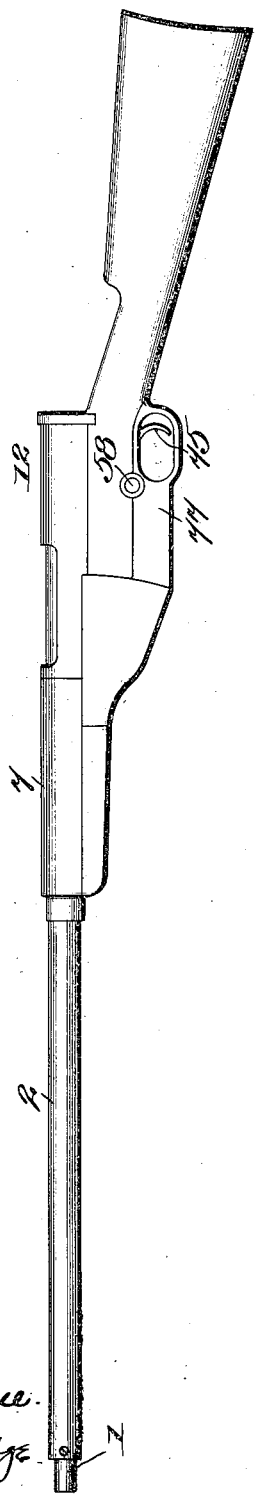
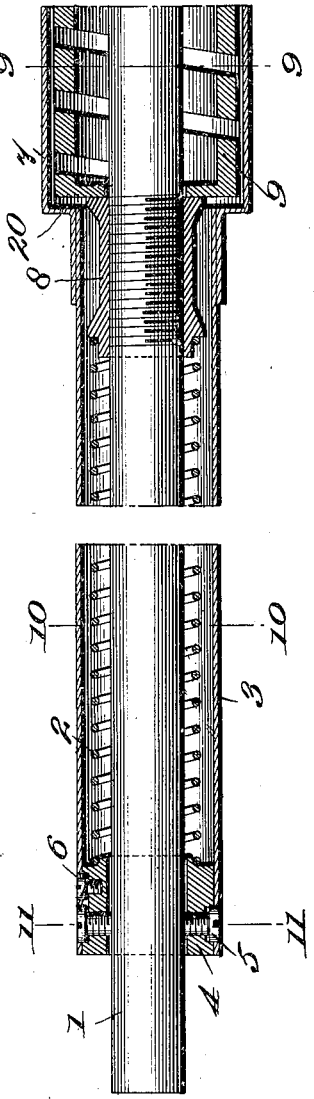

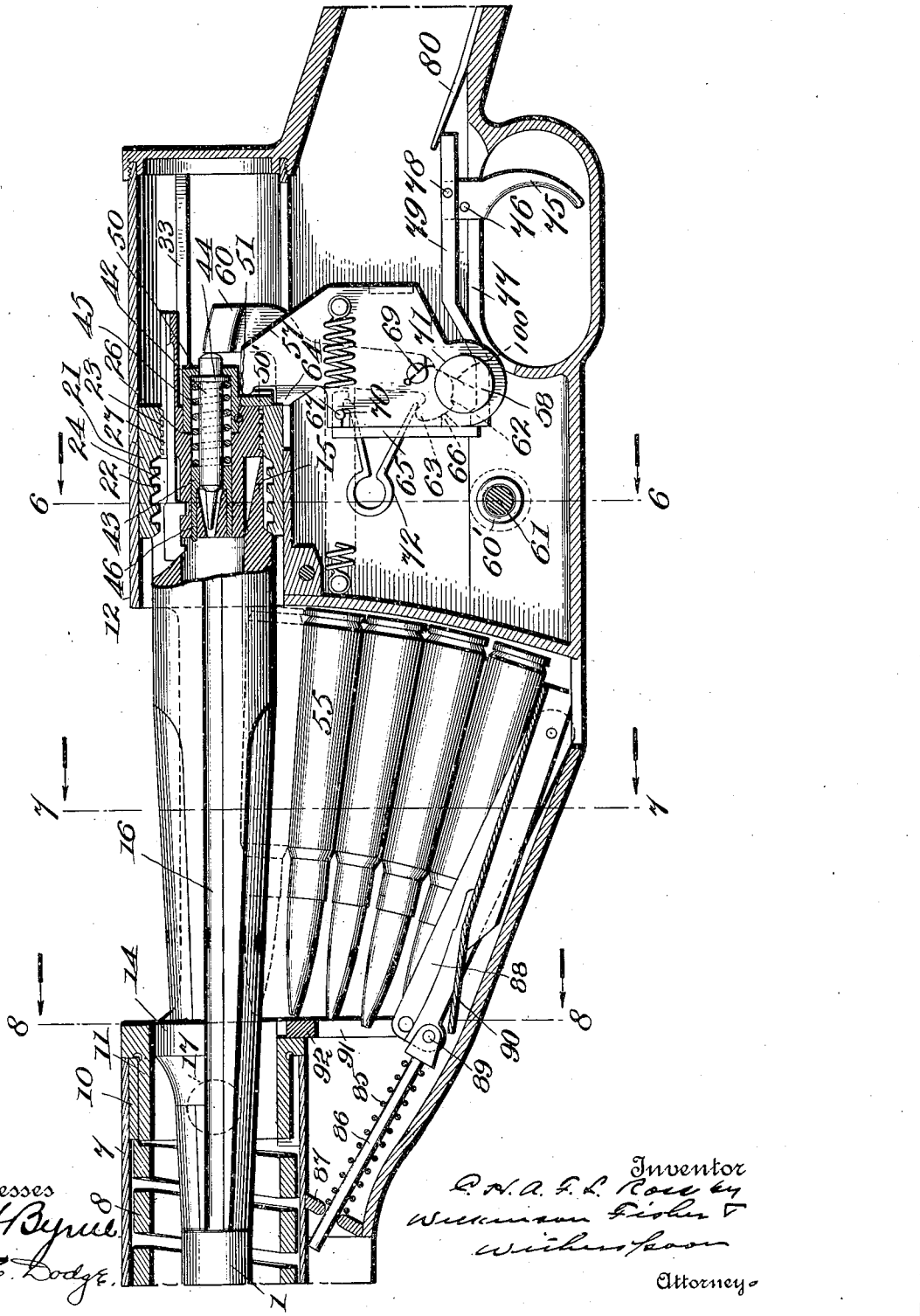

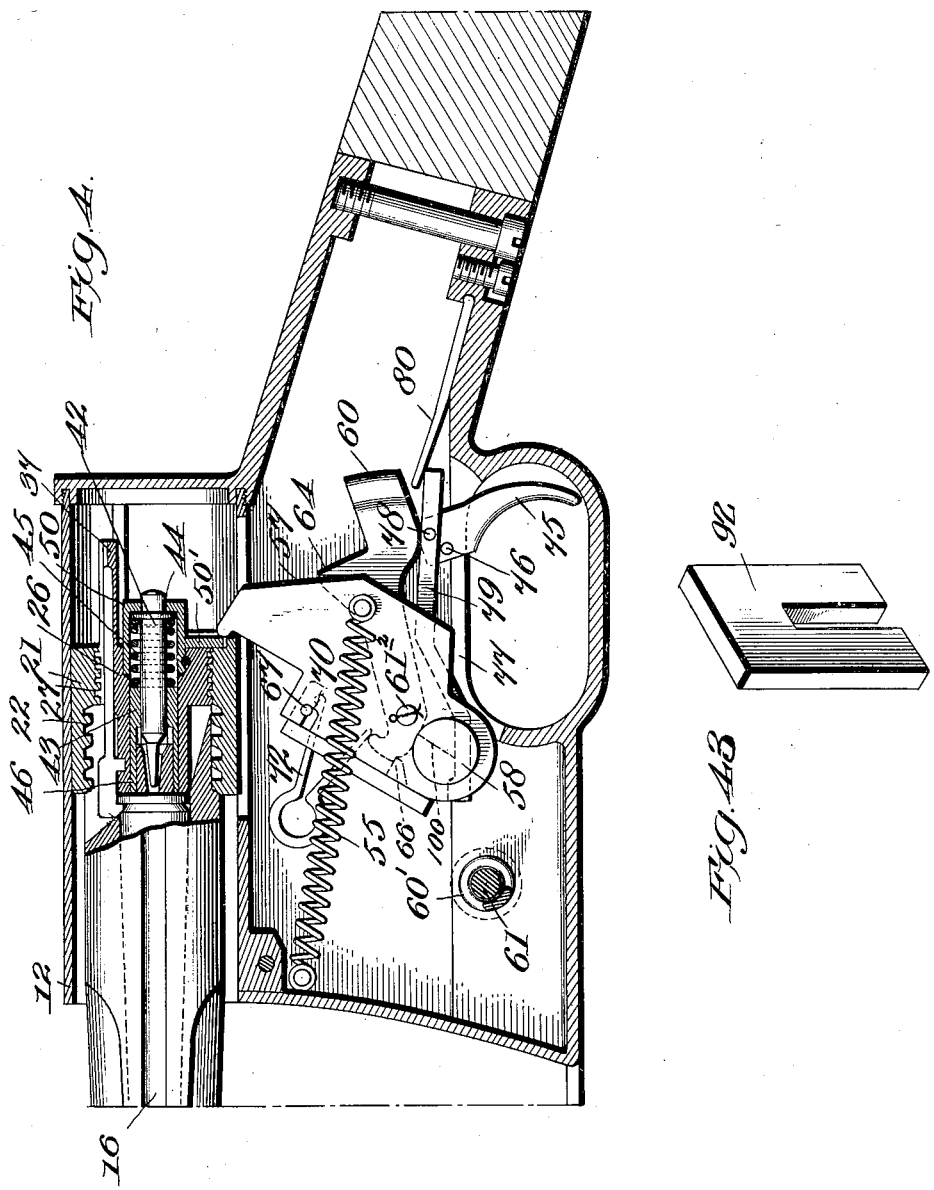

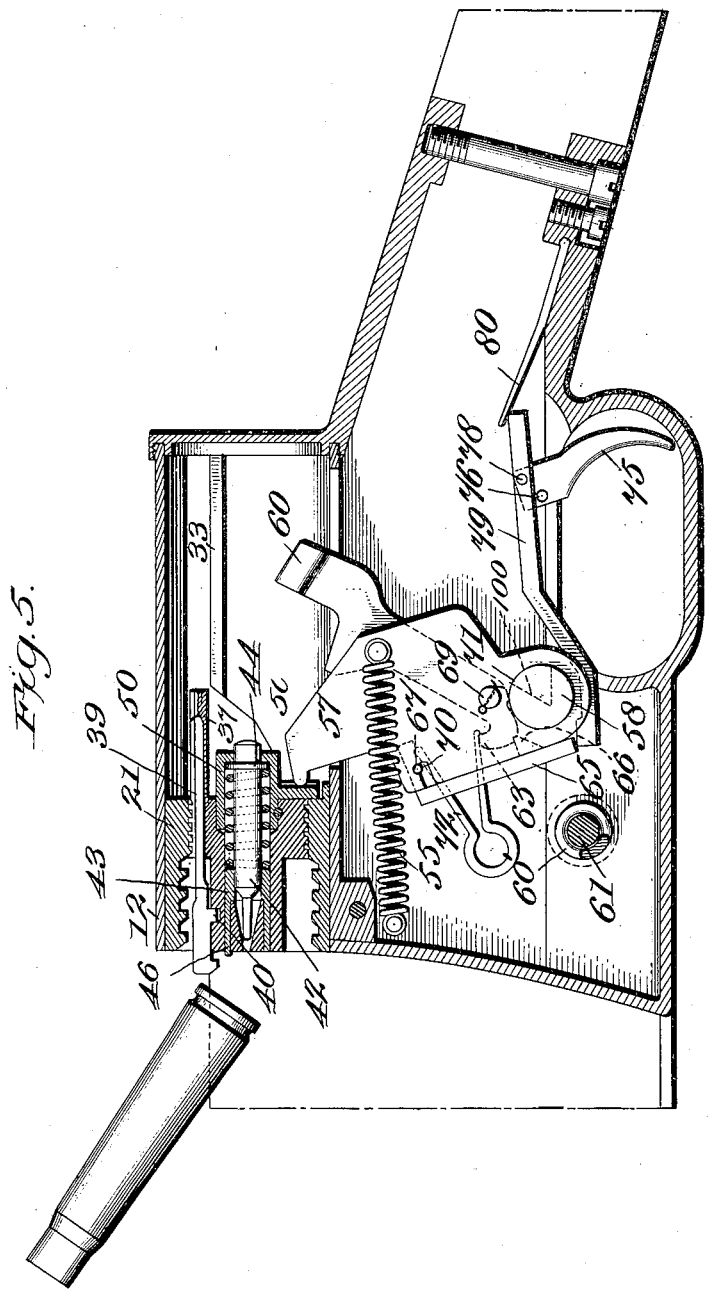

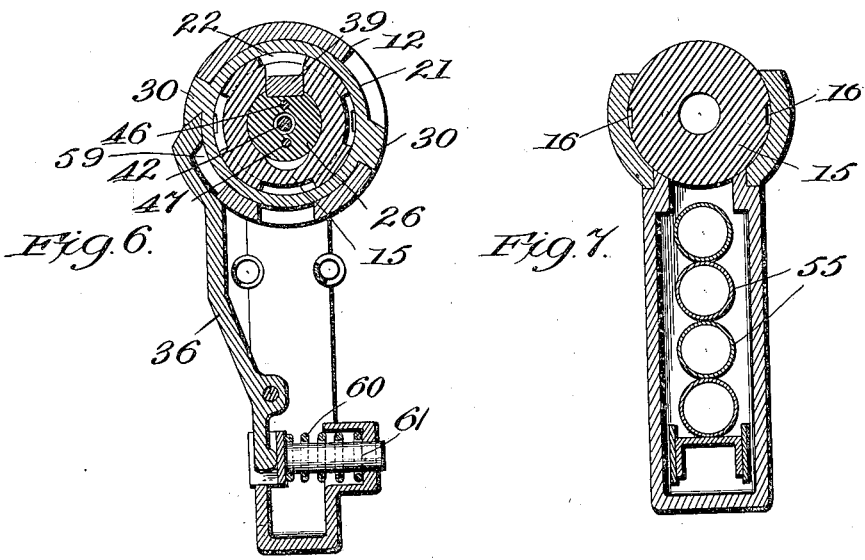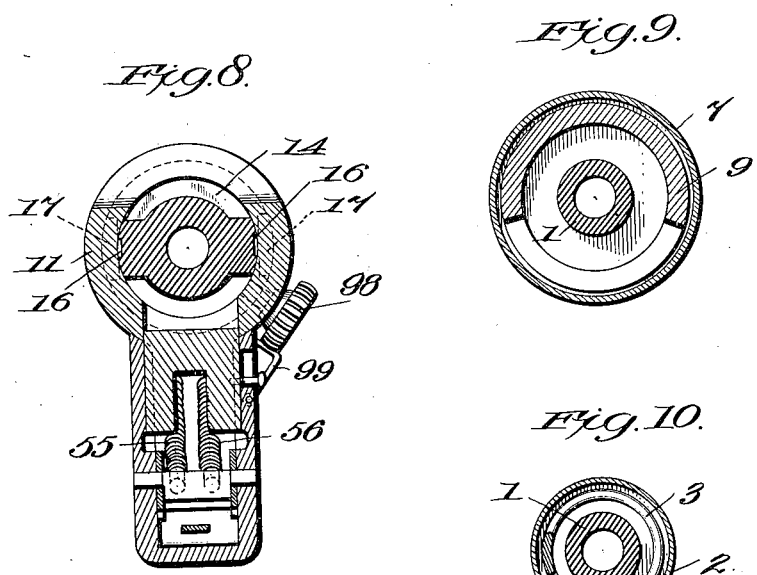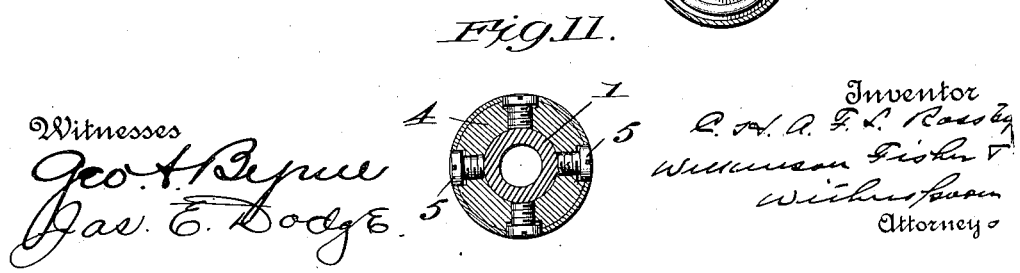

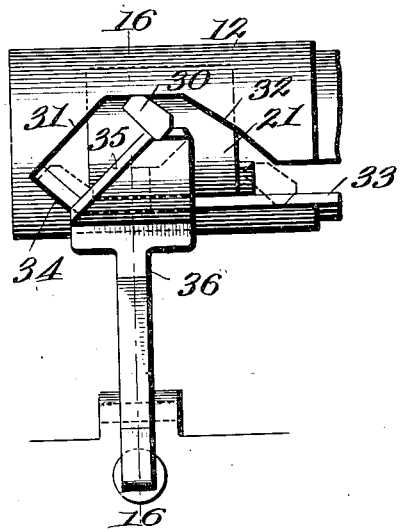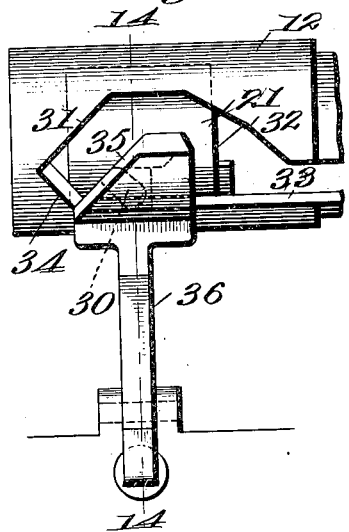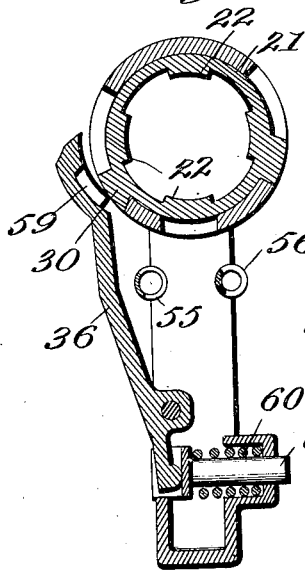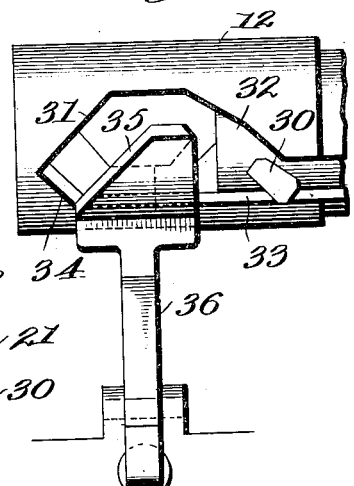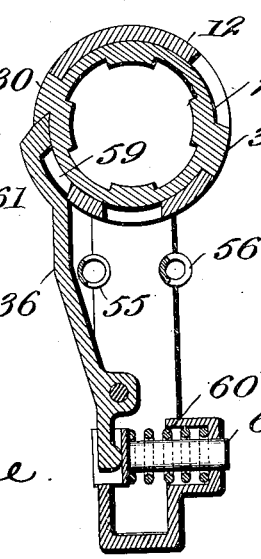

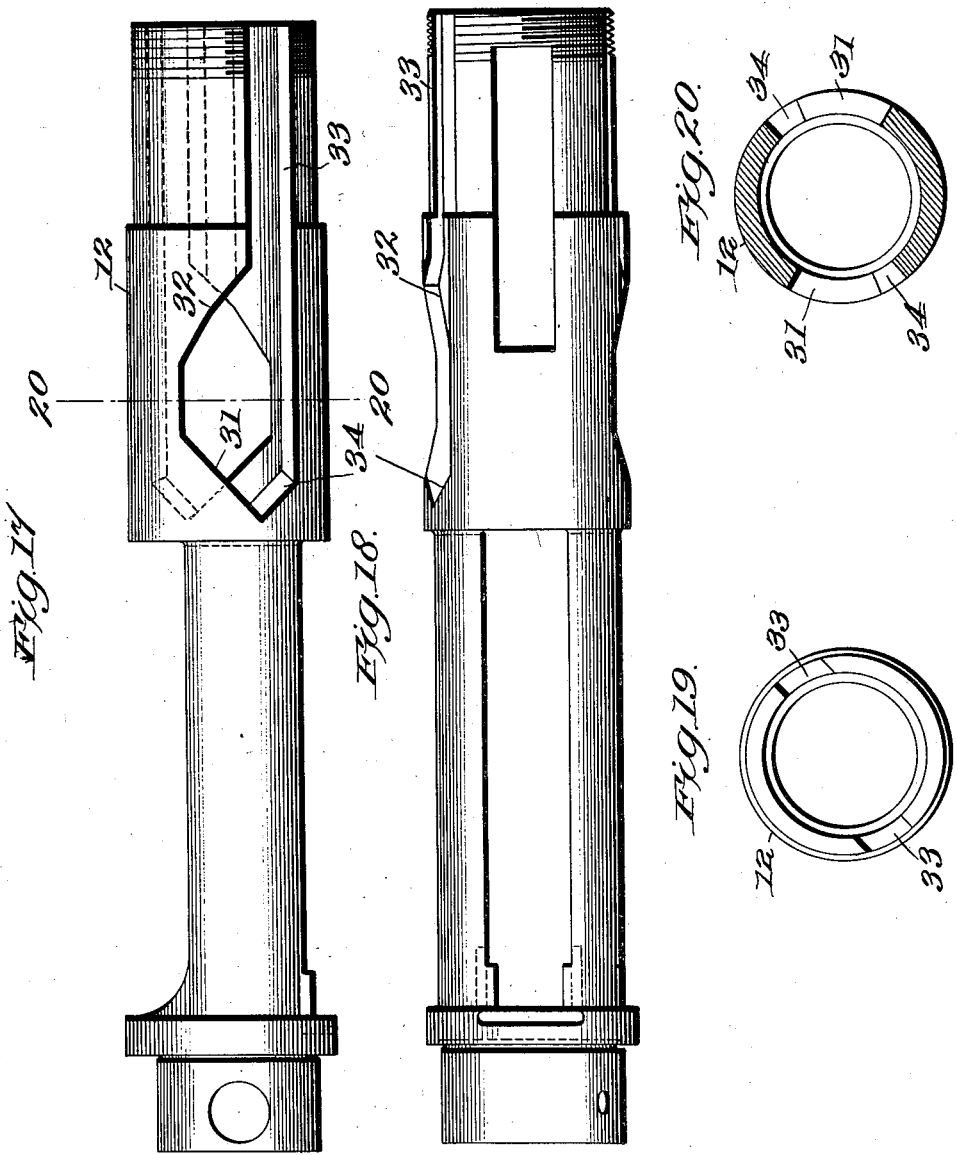

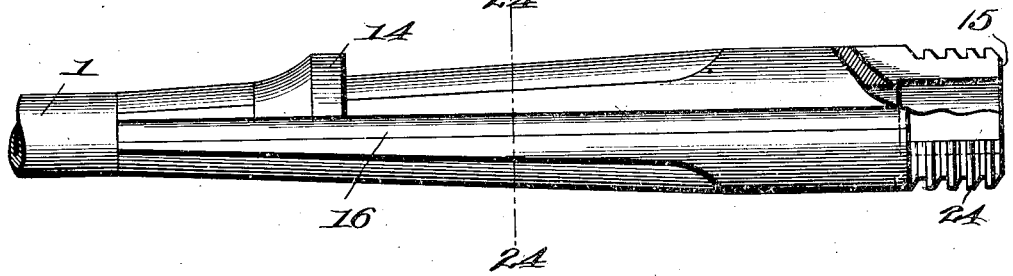
Fig. 21.
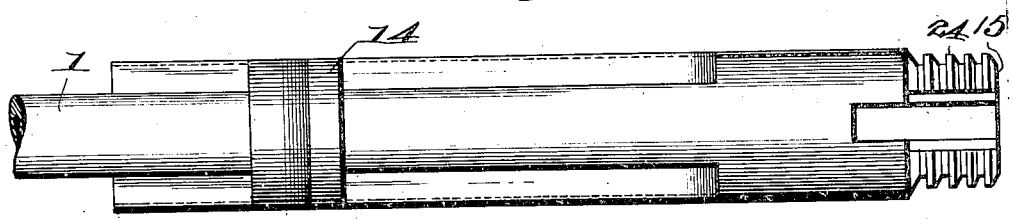
Fig. 22.
Fig. 23.
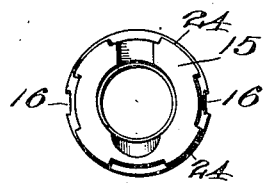
Fig. 25.
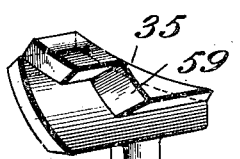
Fig. 26.
Fig. 24.
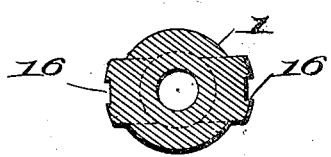

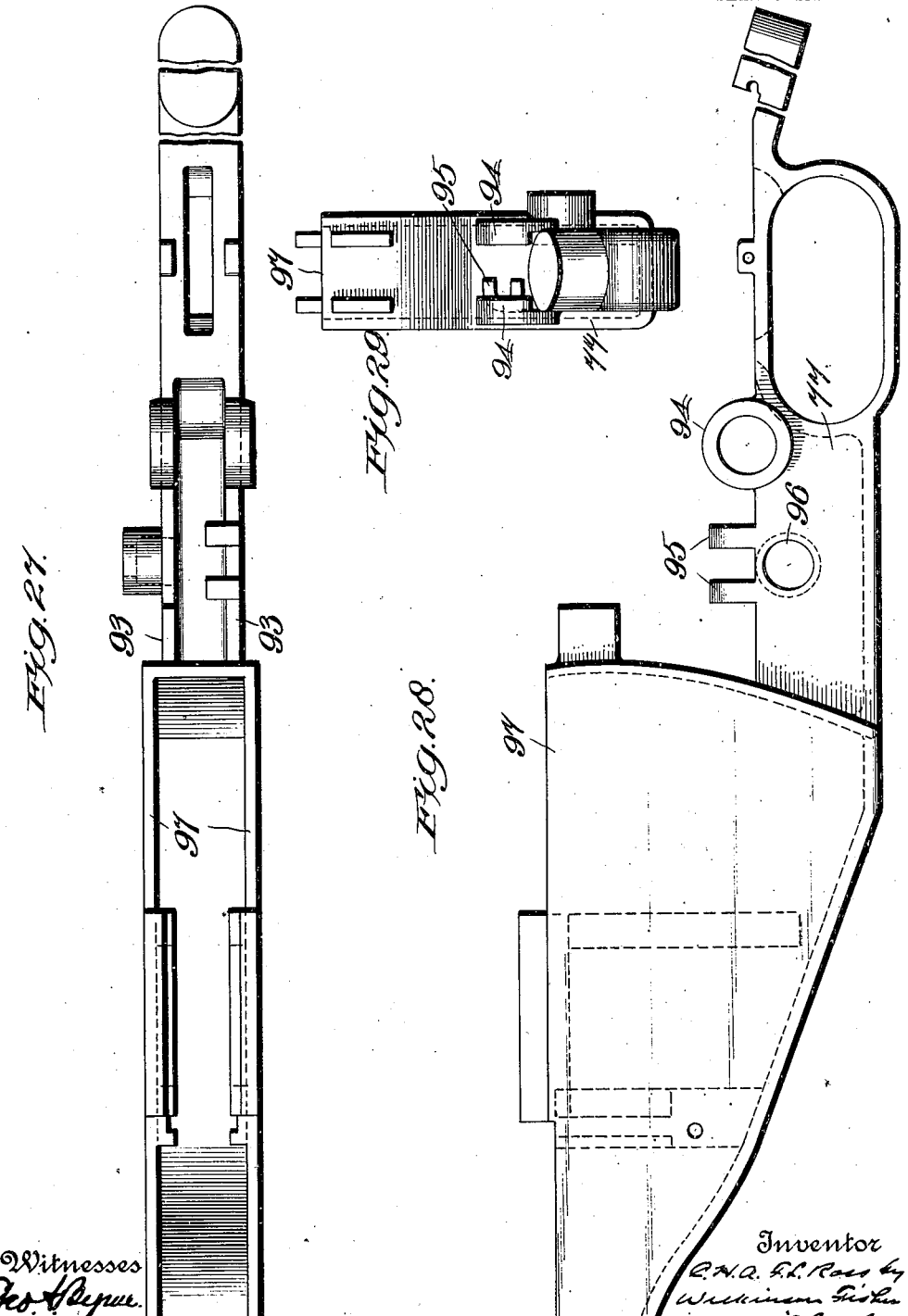

C. H. A. F. L. ROSS.
AUTOMATIC FIREARM.
APPLICATION FILED JUNE 4, 1909.
958,545.
Patented May 17, 1910.
11 SHEETS—SHEET 10.
Fig. 30.　　Fig. 31.
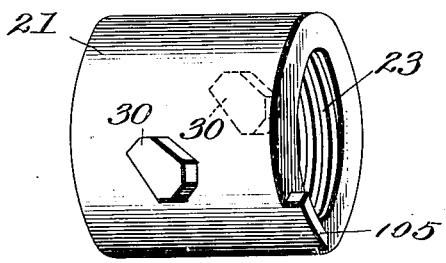 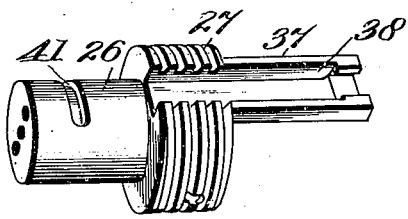
Fig. 32.
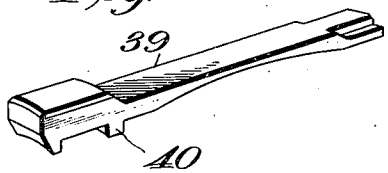
Fig. 33.　　Fig. 34.
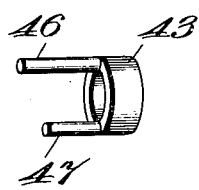 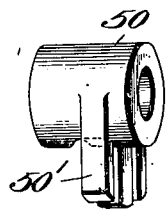
Fig. 35.
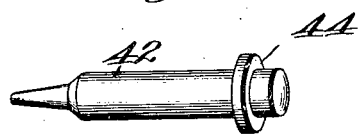
Witnesses
Geo. A. Bepue.
Jas. E. Dodge.
Inventor
C. H. A. F. L. Ross by
Wilkinson Fisher &
Wilkinson
Attorneys

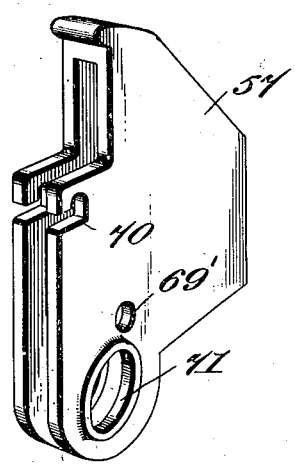
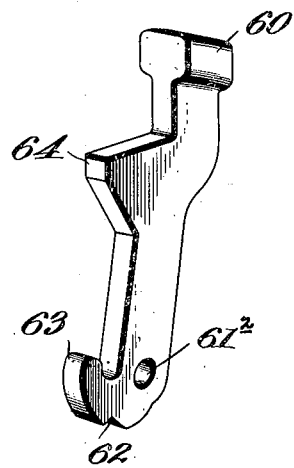
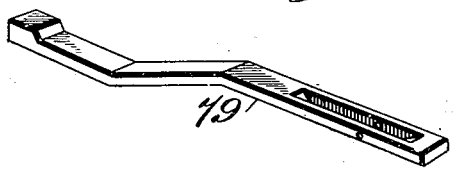
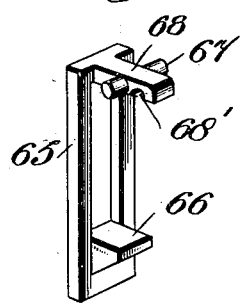
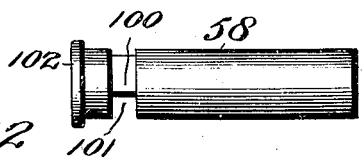

UNITED STATES PATENT OFFICE.

CHARLES HENRY AUGUSTUS FREDERICK LOCKHART ROSS, OF ROSS-SHIRE, SCOTLAND.

AUTOMATIC FIREARM.

958,545. Specification of Letters Patent. Patented May 17, 1910.

Application filed June 4, 1909. Serial No. 500,226.

*To all whom it may concern:*

Be it known that I, CHARLES H. A. F. L. Ross, of Balnagown, in the counties of Ross, Cromarty, Sutherland, and Lanark, in the United Kingdom of Great Britain, a subject of His Majesty the King of Great Britain, a resident of Ross-Shire, Scotland, have invented certain new and useful Improvements in Automatic Firearms; and I do hereby declare the following to be a full, clear, and exact description of the invention, such as will enable others skilled in the art to which it appertains to make and use the same.
My invention relates to automatic fire arms, and has for its object the production of a fire arm of this type which will be comparatively simple in construction; which will be certain in action and not liable to get out of order under hard usage; one that is capable of being used as a single loader or as a magazine loader; and one that will automatically lock the barrel in its forward position after the last cartridge has been fired.

With these and other objects in view the invention consists in the novel details of construction and combinations of parts more fully hereinafter disclosed and particularly pointed out in the claims.

Referring to the accompanying drawings forming a part of this specification in which like numerals refer to like parts in all the views:—Figure 1 is a side elevational view of my improved type of gun. Fig. 2, is an enlarged longitudinal section of the barrel casing, showing the parts contained therein. Fig. 3, is a longitudinal section showing the breech, the firing and the loading mechanism and their operating parts in the position immediately after firing and before the recoil has occurred. Fig. 4, is a view similar to Fig. 3, of the breech mechanism showing the barrel at the limit of recoil. Fig. 5, is a view similar to Fig. 4, with the barrel omitted, showing the position assumed by the breech mechanism after the barrel has gone forward on counter recoil and slightly beyond the firing position, and showing an empty shell being ejected. Fig. 6, is a cross section taken on the line 6—6 of Fig. 3 and looking in the direction of the arrows, and with the outer cover or casing omitted. Fig. 7, is a cross section taken on the line 7—7 of Fig. 3 and looking in the direction of the arrows, also omitting the outer casing. Fig. 8, is a like cross section taken on the line 8—8 of Fig. 3 and looking in the direction of the arrows. Fig. 9, is a cross section taken on the line 9—9 of Fig. 2. Fig. 10, is a cross section taken on the line 10—10 of Fig. 2. Fig. 11, is a cross section taken on the line 11—11 of Fig. 2. Fig. 12, is a detail view showing the latch, receiver, and bolt sleeve in its locked position. Fig. 13, is a view similar to Fig. 12, showing the bolt sleeve after it has advanced toward its unlocked position. Fig. 14, is a cross section on the line 14—14 of Fig. 13. Fig. 15, is a view similar to Figs. 12 and 13 showing the parts in their unlocked position. Fig. 16, is a cross section on the line 16—16 of Fig. 12. Fig. 17, is a detail side elevation of the receiver showing its cam slots. Fig. 18, is a detail plan view of the receiver. Fig. 19, is an end view of the receiver looking toward the left in Fig. 17. Fig. 20, is a cross section on the line 20—20 of Fig. 17. Fig. 21, is a detail side elevation of the gun barrel showing the slide grooves. Fig. 22, is a detail plan view of the gun barrel. Fig. 23, is an end view of the gun barrel looking toward the left in Fig. 21. Fig. 24, is a cross section of the gun barrel taken on the line 24—24 of Fig. 21. Fig. 25, is a detail perspective view of the latch. Fig. 26, is a detail perspective view of one of the buttons for guiding the barrel. Fig. 27, is a detail top plan view of the trigger guard and its connecting parts. Fig. 28, is a detail side elevation of the trigger guard and its parts shown in Fig. 27. Fig. 29, is an end view of the parts shown in Fig. 27, looking toward the left in said figure. Fig. 30, is a detail perspective view of the bolt sleeve. Fig. 31, is a detail perspective view of the bolt. Fig. 32, is a detail perspective view of the extractor. Fig. 33, is a detail perspective view of the ejector. Fig. 34, is a detail perspective view of the ejector and firing pin retainer. Fig. 35, is a detail perspective view of the firing pin. Fig. 36, is a detail perspective view of the yoke associated with the firing mechanism. Fig. 37, is a detail perspective view of the hammer. Fig. 38, is a detail perspective view of the trigger pawl. Fig. 39, is a detail perspective view of the trigger. Fig. 40, is a detail perspective view of the sear. Fig. 41, is a detail view of the cocking bolt. Fig. 42, is a detail view of the hammer spring, and Fig. 43, is a detail perspective view of the barrel stop.

1 represents the barrel; 2 a casing surrounding the forward portion of the barrel; and 3 a loading spring inside the casing and also surrounding the barrel.

At the forward end of the barrel is a collar 4 slidingly secured to the barrel by suitable adjustable fastenings 5, and to this collar the outer end of the casing is secured, as by the screws 6, while the outer end of the loading spring also rests against said collar, as shown.

The inner end of the barrel casing is conveniently slipped into the outer end of the enlarged section 7 of said casing, as illustrated, and a spool or collar 8, which receives the inner end of the loading spring, is suitably secured to the barrel as by screw threads, as shown. Inside the section 7 and surrounding the barrel is the recoil or main spring 9, which is heavier or stronger than the loading spring 3, and the outer end of which abuts against the rear end of the spool 8. The rear end 10 of this spring, as best shown in Fig. 3, snugly fits, as by a ground joint, between the rear end of the casing 7, and the forward end 11 of the receiver 12. The barrel 1 is preferably tapered at 13, where it passes through the end 11 of the receiver, and is also provided with an enlargement 14, which closes said receiver end when in its firing position. Between the tapered portion 13, and the extreme rear end 15 of the barrel on each side extend guide ways 16, in which fit the guide lugs 18 of the guide buttons 17, see Figs. 3, 8 and 26. These buttons are fitted in recesses in the end portion 11 of the receiver, and are securely held between the sides of the barrel and the inside of said receiver, as illustrated in dotted lines in Fig. 8.

It is evident from what has now been said that the barrel is free to slide forward and backward, and when it moves forward the loading spring 3 will be compressed, owing to the collar 4 remaining stationary; while the muzzle end of the spring 9 will abut against the shoulder 20 of the casing 7 and cushion the forward movement. In the same way, when the barrel moves to the rear, the spool 8 will abut against and cause the recoil spring 9 to be compressed owing to its rear end 10 being held against the stationary end 11 of the receiver.

Slidingly fitting the receiver is a bolt sleeve 21, Figs. 3, 6, 12, 13, 14 and 30, which is provided with an enlarged bore having interrupted lugs or rings 22, and a smaller bore having screw threads 23. The lugs 22 interlock with correspondingly interrupted lugs 24 on the rear end 15 of the barrel, and the parts are adapted for engagement and disengagement after a partial turn of the sleeve, as will be readily understood.

The bolt 26, Fig. 31, is provided with a screw threaded enlargement 27 fitting the screw threads 23 of the sleeve, and slides and turns with it. The sleeve 21 is also provided on each side with a cam lug 30, Figs. 12, 15 and 30, while the receiver is provided with cam slots each having the cams 31 and 32, and the straight portion 33.

It is evident, from what has been so far disclosed, if the lugs 30 are in the position indicated in Fig. 12, and the barrel moves to the rear, that the said lugs wil strike the cam 32 of the slots and be thrown down into the dotted line position contacting with the straight portion 33, as indicated in Fig. 12; whereupon the sleeve will be rotated on its axis, and unlocked from the barrel. It is also evident that if when in the said dotted line position the sleeve and lugs are moved forward along the straight portion 33 until the lugs abut against the stop 34, and if then the sleeve is again moved to the rear with the lugs in engagement with the cam surface 35 on the latch 36, that the sleeve will be again rotated into its locked position, all as will be more fully disclosed hereinafter.

Referring again to the bolt 26, it is provided with an extension 37 having a T-shaped slot 38 to receive the extractor 39, having a lug 40 filling a slot 41 in the bolt, to prevent longitudinal movement of the extractor. The extractor fitted as described also prevents the bolt from rotating relatively to the barrel. The bolt is also bored out to receive the firing pin 42, and the ejector 43, Figs. 3, 33 and 35, through which the firing pin passes. The firing pin is provided with the collar 44, and a spring 45 extends between said collar and ejector, which keeps the firing pin normally retracted and the ejector normally projecting beyond the end surface of the bolt, as illustrated in Fig. 3. The ejector is provided with a longer pin 46 and a shorter guide pin 47, which extend through holes bored through the bolt, and when a cartridge is in the gun the longer pin 46 contacts with the same and causes the spring 45 to be put under compression, as will be readily understood. That is to say, when the barrel moves away from the bolt the cartridge shell will still be held against the same by the extractor, and the ejector spring being under compression will then force the said shell out of the breech opening, as indicated in Fig. 5, as soon as the forward end of the shell clears the barrel.

The ejector, firing pin and spring are held in place by the retainer 50, which enters the bolt as shown, and which is secured in place by the pin 51, which passes through the bolt and is held on the interior of the screw thread portion 23 of the sleeve 21. This retainer is also provided with the slotted lugs 50', as best seen in Fig. 34, and between these lugs reciprocates the upper end of the yoke 57, as best shown in Figs. 3, 4 and 5, as the bolt moves backward and forward, and thereby effectually prevents the retainer from turning with the sleeve, all as will appear from what follows.

It will now be clear from the foregoing that upon discharging the piece the firing pin will be driven forward against the tension of the spring 45, the barrel will recoil against the tension of the spring 9, and the lugs 30 will strike against the cams 32 and will unlock the sleeve 21 and bolt from the barrel. The barrel will thereupon suffer a counter recoil and move forward against the tension of the loading spring 3, compressing the latter and opening the breech sufficiently for a cartridge 55 to be moved upwardly from the magazine, and to be picked up and inserted into the barrel upon the latter being again returned to the rear by the said loading spring, all as will appear more fully below. When the barrel moved forward, however, on counter recoil, the sleeve 21 and bolt 26, being unlocked, were left in their rearmost position shown in Fig. 4. In this position a pair of springs 55, 56, the latter being the heavier, as shown in Fig. 16, are placed under tension by the energy of recoil, owing to their connection with a yoke 57 pivoted on the rod 58 and contacting with the sleeve as shown. At the proper time, as will be explained, these springs through the yoke move the sleeve and breech bolt forward until the lugs 30 abut against the surface 34 of the receiver, Fig. 12. Before the lugs reach this position, however, one of them encounters the cam surface 59 of the latch 36, Fig. 25, thereby forcing the latch outwardly, as indicated in Fig. 14, against the tension of the spring 60' surrounding the plunger bolt 61 against which the lower end of the latch impinges. As soon as the lug 30 passes the cam 59, the latch snaps back into place under the influence of its spring, and brings its cam surface 35 up against the rear edge of the lug 34, as best shown in Fig. 12. When in this position the sleeve 21 is slightly forward of its firing position, and is ready to receive the interrupted slotted rear end 15 of the barrel; and as the latter after picking up a cartridge is driven to the rear, it enters the sleeve 21 and forces it back to the firing position. In doing so, however, the lug 30 must ride up the cam surface 35 before the firing position can be assumed, and therefore the sleeve and barrel must be interlocked when the gun is fired. During the forward movement of the sleeve 21, the heavier spring 56 acts to accelerate the forward motion of the bolt, but after the sleeve in its forward movement reaches its firing position this spring ceases to act. The lugs 30 are under-cut, as shown in Figs. 14 and 16, and the latch is correspondingly shaped to fit one of the same, so when the firing position is assumed the parts are firmly locked, as indicated.

The firing mechanism comprises a hammer 60 pivoted in the yoke at $61^2$, and provided with a sear notch 62, a toe 63 and a projection 64, Figs. 4 and 37. The sear 65 is best shown in Fig. 40, and consists of a tripping lug or point 66, a pivot 67 on the projection 68 having the notch 68'. The yoke 57, Fig. 36, is a hollow casing, as shown, and is provided with a hole 69' for the hammer pivot pin, an L-shaped notch 70 for the sear pivot 67, and a hole 71 for the cam bolt 58, Fig. 41. A combined sear and hammer spring 72 of a V-shaped construction rests with one end on the toe 63 of the hammer and with its other end in the notch 68' of the sear projection, as shown in Fig. 4.

The trigger 75 is pivoted at 76 to the trigger guard 77, and at 78 to the pawl 79 controlled by the spring 80. It is clear from Figs. 3, 4 and 5 that when the hammer is cocked and the parts are in their firing positions, that upon pulling the trigger, the pawl 79 will move forward against the lower end of the sear, will swing the latter on its pivot and thereby disengage its lug 66 from the sear notch 62 on the hammer. That then the spring 72 will swing the hammer on its pivot, and will at the same time through its action on the projection 68 of the sear force the lower end of the sear to the rear, which in turn contacts with the forward end of the pawl 79, and through the latter and the spring 80, the trigger will be restored to its forward position as soon as it is released. The parts before the recoil has taken place will be in the position shown in Fig. 3. As the recoil occurs, however, the yoke 57 will be turned on its pivot to the position shown in Fig. 4, whereupon the sear lug engages the sear notch on the hammer, and when counter recoil occurs and the yoke assumes the position shown in Fig. 5, which is forward of the firing position, the hammer is cocked, but the pawl 79 is in its safety position out of contact with the sear. As the parts again return to the rear from the position shown in Fig. 5, to the firing position, the yoke lever 57 is again turned on its pivot sufficiently to permit the lower end of the sear to pass off the forward end of the pawl 79, whereupon the spring 80 snaps said pawl end up behind the sear, as best shown in Fig. 3, when the parts are ready to be again fired.

Referring again to Figs. 3, 4 and 5, and particularly to the cocking bolt and yoke pivot 58 best shown in Fig. 41, it will be observed that this bolt is provided with a cut away cam portion 100, and a slot 101 into which the lower end of the hammer 60 fits. It is also provided with a cocking head 102, which projects on the outside of the gun, and may be readily grasped by the hand. It is clear that if the bolt 58 is turned by hand in a counter-clockwise direction, as seen in Fig. 3, that the cam 100 will contact with the lower end of the hammer and cock the same. In fact this is the usual operation of cocking the piece by hand; and substantially the same action takes place when the said bolt 58 is turned by the yoke 57, under the influence of the springs 55 and 56, as above disclosed. Again, as best shown in Fig. 30, the bolt sleeve 21 is provided with a projection 105, which will be struck by the projection 64 on the hammer and thereby prevent said hammer from driving the firing pin forward whenever the said sleeve is not in its locked position, so that it is impossible for the piece to be discharged when the parts are not locked together.
A light dust cover, not shown except in Fig. 1, protects all the parts.

As stated above, when the barrel goes forward on counter recoil it uncovers the magazine and a cartridge 55 is forced up into position to be picked up by the barrel on its return to the rear. The cartridge is lifted by the action of the spring 85 surrounding the rod 86 reciprocating through the guide 87, and pivoted at its rear end 89 to any suitable or well known cartridge lifter 88 having a parallel motion by which each cartridge is accurately brought into the proper position to be loaded into the barrel. This cartridge lifter is provided with a projection 90, which plays up and down in the slot 91 of the sliding barrel stop 92, and the parts are so proportioned that when the last cartridge is fired the said projection will force said stop up behind the barrel and lock it in its forward position, when cartridges may be again placed in the magazine and the barrel released. If desired, of course, the barrel stop and projection may be thrown out of action by any suitable mechanism, such as a locking projection, not shown, on the right side of the gun, and the gun then used as a single loader.

The firing mechanism and its associated parts are supported by the trigger guard frame 77 and its connections; which, as best illustrated in Figs. 27, 28 and 29, is or may be of metal, and comprises the trigger guard proper, with the parallel extensions 93, provided with the bored lugs 94 for the accommodation of the cam cocking bolt and pivot 58, with the lugs 95, the hole 96, the fore stock extensions 97 to accommodate the magazine, and with other features adapted to facilitate the ready assembling and disassembling of the piece. 98, Fig. 8, represents a take down screw provided with a locking means 99, the removal of which enables the gun to be taken to pieces.

The operation of the gun will be clear from the foregoing, but may be briefly summarized as follows:—Upon pulling the trigger, the pawl 79 forces forward the lower end of the sear 65, and releases the hammer 60, which under the influence of the combined hammer and sear spring 72 drives forward the firing pin 42 against the tension of the combined firing pin and ejector spring 45, which explodes the cartridge. The barrel 1 now recoils, compressing the main spring 9, and carrying the bolt and sleeve 21 to the rear about the distance of an inch. As the sleeve recedes it turns the yoke 57 on the cocking bolt 58 as a center and against the tension of the springs 55 and 56. The hammer being pivoted at 69 in said yoke rotates around said cocking bolt, and its lower end strikes the cam 100, which throws forward the sear notch 62 into engagement with the sear lug 66, and in the meantime compressing the spring 72 which thereupon holds the sear and hammer into firm engagement. The said sear, however, being pivoted to the yoke in the notch 70, will have been swung clear of the pawl 79, and therefore, although the hammer spring is under tension, yet the trigger cannot trip the hammer, as will be clear from Fig. 4. In the meantime the lugs 30 on the sleeve 21, have taken against the cams 32 in the receiver, and said sleeve has become unlocked from the annular interrupted lugs on the rear end of the barrel. As soon as the barrel reaches the limit of its recoil, its main or recoil spring 9 will expand and project it forward against the tension of the loading spring 2, and beyond its firing position, just as a bow will project an arrow, and this movement of the barrel uncovers the magazine. The springs 55 and 56 in the meantime force forward the upper end of the yoke, and thereby cause the bolt and sleeve to follow the barrel to a point slightly beyond the firing position, or until the lugs 30 strike the surfaces 34. The spring 56 is made stronger than the spring 55, in order to accelerate this movement, but it is so adjusted that it ceases to act when the sleeve reaches the firing position in its longitudinal movement, which is about the time the latch 36 is forced outwardly. The bolt and sleeve remain forward of the firing position, and in their unlocked condition, until the barrel having been returned by the loading spring and having picked up a cartridge on the way back, reëngages the sleeve and carries it back to the firing position. In doing so, however, one of the lugs 30 must ride up the cam 35 on the latch, and thereby cause the interrupted lugs 24 of the barrel to engage the interrupted lugs 22 of the bolt, whereupon the upper end of the latch snaps into the undercut groove on the lug 30 and firmly holds the sleeve in place. When the barrel went forward, the extractor 39 held the cartridge against the ejector pin 46, and the spring 45 being under compression, as soon as the forward end of the cartridge cleared the rear end of the barrel, said ejector pin projected the empty shell clear of the piece, as shown in Fig. 5. When this occurred the sear had been rotated by the yoke so that its lower end depressed the pawl 79 against the action of the spring 80, as shown. When, however, the sleeve and bolt were returned to the firing position, the said sear was rotated sufficiently in the opposite direction to enable said pawl to snap past the lower end of the sear and to be therefore in a position for firing. In other words, it will be observed that the parts are in their safety position and the trigger is inert up to the moment the breech is locked and ready for firing. It will, also, be observed that the parts cannot return to their firing position until all the parts are firmly locked. Furthermore, the hammer cannot strike the firing pin except when the sleeve is locked to the barrel on account of the lug 105; and the point of said pin is normally retracted by the spring 45.

It will be seen that each time the trigger is pulled and released, and there are cartridges in the magazine, the gun will be fired; and that the spring 80 serves to return the trigger to its forward position, as well as to engage the pawl and sear.

After the magazine is exhausted, the barrel is automatically locked in its forward position by the sliding stop piece 92, and the magazine may then be replenished or the gun may be used as a single loader.

When it is desired to open the gun by hand, the bolt 61 may be pressed in to disengage the lug 30 from the latch 36, and the hammer may be cocked by turning the cocking bolt 58, thereby permitting the bolt sleeve 21 to rotate to the unlocking position.

It is obvious that those skilled in the art may make changes in details of construction and in the arrangement of parts without departing from the spirit of this invention, and therefore I do not wish to be limited to such features except as may be required by the claims.

What I claim is:—

1. In an automatic gun, the combination of a sliding barrel, main and loading springs surrounding the same; a magazine; a breech mechanism; and means comprising a reciprocating and rotating sleeve provided with an interrupted connection with said barrel, and cams, lugs and a cam latch for automatically causing said barrel and sleeve to unlock and to interlock; substantially as described.

2. In an automatic gun, the combination of a sliding barrel; main and loading springs surrounding the same; a magazine; an automatic cocking mechanism; an automatic ejecting mechanism; a rotating sleeve; interrupted connections between said barrel and sleeve; and means comprising cams, lugs and a cam latch for automatically causing said barrel and sleeve to unlock and to interlock; substantially as described.

3. In an automatic gun, the combination of a reciprocating barrel; main and loading springs surrounding said barrel; a sleeve provided with an interrupted connection with said barrel; and means comprising cams, lugs, and a cam latch for automatically causing said barrel and sleeve to unlock and to interlock upon firing the piece; substantially as described.

4. In an automatic gun, the combination of a reciprocating barrel; a main spring; a loading spring adapted to be compressed by said main spring; a reciprocating and rotating sleeve provided with an interrupted connection with said barrel; a breech bolt secured in said sleeve; and means for causing said sleeve as it reciprocates to engage and disengage said barrel, substantially as described.

5. In an automatic gun, the combination of a reciprocating barrel; a main spring; a loading spring adapted to be compressed by said main spring; a reciprocating and rotating sleeve provided with an interrupted connection with said barrel; a breech bolt secured in said sleeve; means for causing said sleeve as it reciprocates to engage and disengage said barrel; and additional spring pressed means for impelling forward said bolt and sleeve after the barrel has recoiled, substantially as described.

6. In an automatic gun, the combination of a reciprocating barrel; a sleeve; interrupted connections between said barrel and sleeve; a breech bolt secured in said sleeve; and means comprising cams, lugs and a cam latch for automatically causing said barrel and sleeve to unlock and to interlock, substantially as described.

7. In an automatic gun, the combination of a reciprocating barrel; a sleeve; interrupted connections between said barrel and sleeve; a breech bolt secured in said sleeve; a receiver in which said sleeve reciprocates provided with a cam and a slot; a latch provided with a cam; and a lug on said sleeve adapted to coact with said cam, slot and latch and to cause said sleeve to automatically engage and disengage said barrel, substantially as described.

8. In an automatic gun, the combination of a reciprocating barrel; a sleeve; interrupted connections between said barrel and sleeve; a breech bolt secured in said sleeve; a receiver in which said sleeve and bolt reciprocate provided with a cam and a slot; a latch provided with a cam; and a lug on said sleeve provided with an undercut groove into which the end of said latch fits and adapted to coact with said cam, slot and latch and to cause said sleeve to automatically engage and disengage said barrel, substantially as described.

9. In an automatic gun, the combination of a barrel; a sleeve; an interrupted slotted connection between said barrel and sleeve; a breech bolt secured in said sleeve; an ejector in said bolt; a firing pin passing through said bolt and ejector; and a spring adapted to normally hold said pin retracted and said ejector protruding beyond said bolt, substantially as described.

10. In an automatic gun, the combination of a reciprocating barrel; a reciprocating breech closure; means for reciprocating said barrel; independent means for moving said breech closure forward of its firing position; and means for automatically locking said closure to said barrel when the latter returns to its firing position, substantially as described.

11. In an automatic gun, the combination of a reciprocating barrel; a reciprocating breech closure; means for reciprocating said barrel; independent means comprising a plurality of springs one of which is stronger than the other and a lever for moving said breech closure forward of its firing position; and means for automatically locking said closure to said barrel when the latter returns to its firing position, substantially as described.

12. In an automatic gun, the combination of a barrel; a reciprocating breech closure adapted to interlock with the same; a yoke lever adapted to move with said closure; a spring attached to said yoke; a sear and a hammer carried by said yoke; and means whereby said hammer is cocked when said yoke is moved to the rear, substantially as described.

13. In an automatic gun, the combination of a reciprocating barrel; a reciprocating breech closure adapted to interlock with the same; a yoke lever adapted to move with said closure; a spring attached to said yoke adapted to cause said closure to move forward; a sear and a hammer carried by said yoke; and means comprising a cam whereby said hammer is cocked when said yoke is moved to the rear, substantially as described.

14. In an automatic gun, the combination of a pivoted yoke; a hammer pivoted to the same; a sear pivoted to the yoke; and a single spring for actuating said hammer and sear, substantially as described.

15. In an automatic gun, the combination of a pivoted yoke; a spring for moving the yoke; a hammer pivoted to the yoke; a sear carried by the yoke; a single spring for actuating said hammer and sear; and a cam for cocking said hammer when said yoke is turned on its pivot, substantially as described.

16. In an automatic gun, the combination of a reciprocating breech block; a pivoted yoke for moving the same in one direction; a spring for moving the yoke; a hammer pivoted to the yoke; a sear carried by the yoke; a single spring for actuating said hammer and sear; and a cam for cocking said hammer when said yoke is turned on its pivot by the movement of said breech block in the other direction, substantially as described.

17. In an automatic gun, the combination of a pivoted yoke; a hammer and a sear eccentrically pivoted to said yoke; means carried by the pivot of said yoke for cocking the hammer; and a pawl adapted to disengage said hammer and sear, substantially as described.

18. In an automatic gun, the combination of a pivoted yoke; a hammer and a sear eccentrically pivoted to said yoke; means carried by the pivot of said yoke for cocking the hammer; a pawl adapted to disengage said hammer and sear; a trigger for reciprocating said pawl; and a spring for controlling said trigger and pawl, substantially as described.

19. In an automatic gun, the combination of a pivoted yoke; a sear and a hammer eccentrically pivoted to said yoke and adapted to engage when said yoke is moved; a pawl for controlling said sear, and a trigger for controlling said pawl; the parts being so arranged that when said yoke is turned on its pivot to engage said sear and hammer, said pawl will be out of engagement with said sear, substantially as described.

20. In an automatic gun, the combination of a hammer; a sear adapted to engage the same; a yoke carrying said hammer and sear and adapted to swing to the rear of and to the front of its firing position; and means adapted to trip said sear only after said yoke has returned to its firing position, substantially as described.

21. In an automatic gun, the combination of a hammer; a cam for cocking the same; a sear; a movable yoke carrying said hammer and sear; and means whereby said hammer may be fired only when said yoke is in its firing position, substantially as described.

22. In an automatic gun, the combination of a yoke; a pivot for the same having a cocking cam; a hammer pivoted to the yoke; a sear pivoted to the yoke; a spring carried by the yoke for actuating said hammer and sear; a pawl for tripping said sear; a trigger controlling said pawl; and a spring for controlling said trigger and pawl, substantially as described.

23. In an automatic gun, the combination of a hammer; a sear; a spring for actuating said hammer and sear; a trigger; a pawl controlled by the trigger and adapted to trip the sear; means for moving said hammer and sear into and out of their firing positions; and means by which said pawl can only trip said sear when said first mentioned means is in its firing position, substantially as described.

24. In an automatic gun, the combination of a reciprocating barrel; a reciprocating breech closure; an interrupted slotted connection between said barrel and closure; a pivoted yoke; a hammer and sear carried by said yoke and adapted to be brought into engagement when said closure moves to the rear; a spring for moving said yoke forward of its firing position; means for then returning the same to its firing position; a pawl for tripping said sear; and means for causing said sear to be out of the path of said pawl at all times except when said yoke is in its firing position, substantially as described.

25. In an automatic gun, the combination of a reciprocating barrel; a main spring; a loading spring adapted to be compressed by said main spring; a magazine; and a latch adapted to lock said barrel in its forward position after the last cartridge from said magazine has been fired, substantially as described.

26. In an automatic gun, the combination of a reciprocating barrel; a main spring; a loading spring adapted to be compressed by said main spring; a magazine; a lifter for the magazine adapted to present cartridges one after another in the path of said barrel; and a latch adapted to lock said barrel in its forward position after the last cartridge from said magazine has been fired, substantially as described.

In testimony whereof, I affix my signature, in presence of two witnesses.

CHARLES HENRY AUGUSTUS
FREDERICK LOCKHART ROSS.

Witnesses:
THOMAS CRAIG,
W. CAMPBELL.